(12) United States Patent
Douberley et al.

(10) Patent No.: US 10,405,223 B1
(45) Date of Patent: Sep. 3, 2019

(54) SYSTEM AND METHODS FOR INTELLIGENT RESET DELAY FOR CELL SITES IN A NETWORK

(71) Applicant: Sprint Communications Company L.P., Overland Park, KS (US)

(72) Inventors: David N. Douberley, Orlando, FL (US); Bryson Earl, Altamonte Springs, FL (US); Justin L. Ford, Orlando, FL (US); Brian D. Lushear, Winter Springs, FL (US); Jonathan E. Mejias, Orlando, FL (US); Todd M. Szymanski, Winter Park, FL (US)

(73) Assignee: Sprint Communications Company L.P., Overland Park, KS (US)

(*) Notice: Subject to any disclaimer, the term of this patent is extended or adjusted under 35 U.S.C. 154(b) by 120 days.

(21) Appl. No.: 15/432,918

(22) Filed: Feb. 14, 2017

(51) Int. Cl.
*H04W 24/10* (2009.01)
*H04L 12/24* (2006.01)

(52) U.S. Cl.
CPC ......... *H04W 24/10* (2013.01); *H04L 41/0654* (2013.01)

(58) Field of Classification Search
None
See application file for complete search history.

(56) References Cited

U.S. PATENT DOCUMENTS

| | | | |
|---|---|---|---|
| 4,818,990 A | 4/1989 | Fernandes | |
| 5,351,032 A | 9/1994 | Latorre et al. | |
| 8,154,303 B2 | 4/2012 | Maxson et al. | |
| 9,439,092 B1* | 9/2016 | Chukka | H04W 24/04 |
| 2012/0136630 A1 | 5/2012 | Murphy et al. | |
| 2012/0250010 A1 | 10/2012 | Hannay | |
| 2012/0271461 A1 | 10/2012 | Spata | |
| 2014/0277854 A1 | 9/2014 | Jones et al. | |
| 2015/0236780 A1 | 8/2015 | Jalali | |

OTHER PUBLICATIONS

FAIPP Pre-Interview Communication dated Mar. 28, 2016, U.S. Appl. No. 14/809,654, filed Jul. 27, 2015.
Notice of Allowance dated May 10, 2016, U.S. Appl. No. 14/809,654, filed Jul. 27, 2015.

* cited by examiner

*Primary Examiner* — Peter Chen
*Assistant Examiner* — Jeff Banthrongsack

(57) ABSTRACT

A method for intelligent reset delay of cell sites in a network is disclosed. The method comprises a network server communicatively coupled to a network detecting a malfunction and malfunction type from an element in a cell site of the network. The malfunction type corresponds with an automatic reset for the element. The network server is determining that the malfunction is chronic, and in response, delaying automatic reset for the element in the cell site. Based on the malfunction, the network server is determining an amount of disruption impact to the cell site that would be triggered by at least pulling diagnostics data from the element. Based on the amount of disruption impact, the network server is pulling diagnostics data from the element prior to reset and remotely initiating reset for the element in the cell site.

16 Claims, 7 Drawing Sheets

SYSTEM AND METHODS FOR INTELLIGENT RESET DELAY FOR CELL SITES IN A NETWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A cell site may be used as a telecommunications node to provide connection for a wireless service between a user equipment (UE) and a mobile communication network. In some embodiments, cell sites can be elevated, mounted, or co-located with other communications equipment to provide service for a provider's wireless network according to particular location. A cell site may be configured to support one or more wireless technologies and thus may be referred to according to the technology with which it supports, such as being referred to an enhanced Node B (eNB) or base transceiver station. Embodiments of cell sites may vary and take differing form factors, such as independent elevated structures, cell sites include a structure for mounting and/or sheltering elements contained therein or attached thereto, such as a cabinet and/or tower. A cell site may include elements such as transceiver(s), antennas, transmitter(s), receiver(s), digital signal processor(s), electrical power source(s), control electronic(s), and power equipment.

SUMMARY

In an embodiment, a method for intelligent reset delay of cell sites in a network is disclosed. The method includes: detecting, by a network server communicatively coupled to a network, a malfunction and malfunction type from an element in a cell site of the network, where the malfunction type corresponds with an automatic reset for the element. The method also includes determining, by the network server, that the malfunction is chronic, and in response to determining the malfunction is chronic, delaying, by the network server, automatic reset for the element in the cell site. Based on the malfunction, the method includes determining, by the network server, an amount of disruption impact to the cell site that would be triggered by at least pulling diagnostics data from the element. Based on the amount of disruption impact, the method includes pulling, by the network server, diagnostics data from the element prior to reset. The method also comprises remotely initiating, by the network server, reset for the element in the cell site.

In an embodiment, a system for intelligent reset delay of cell sites in a network is disclosed. The system comprises a cell site communicatively coupled to a network, the cell site comprising an element of a plurality of elements that are operable to implement functionality of the cell site. The system also includes a network server communicatively coupled to the network. The network server comprises a non-transitory memory storing an application, and a processor that, upon being configured by execution of the application detects a malfunction and malfunction type from an element in a cell site of the network, where the malfunction type corresponds with an automatic reset for the element. The network server further determines that the malfunction is chronic, and in response to the determination that the malfunction is chronic, delays the automatic reset for the element in the cell site. Based on the malfunction, the network server determines an amount of disruption impact to the cell site that would be triggered by at least pulling diagnostics data from the element. Based on the amount of disruption impact, the network server pulls diagnostics data from the element prior to reset, and remotely initiates reset for the element in the cell site.

In an embodiment, another method for intelligent reset delay of cell sites in a network is disclosed. The method includes: detecting, by a network server communicatively coupled to a network, a malfunction and malfunction type from an element in a cell site of the network, where the malfunction type identifies that the element should be automatically reset in response to the malfunction. The method also includes identifying, by the network server, that the malfunction of the element is chronic based on the malfunction and malfunction type, and in response to determining that the malfunction is chronic, delaying, by the network server, automatic reset for the element in the cell site. Based on the malfunction, the method includes determining, by the network server, an amount of disruption impact to the cell site that would be triggered by at least pulling diagnostics data from the element. Based on the amount of disruption impact, the method includes selectively pulling, by the network server, diagnostics data and sensor data from the element prior to reset. The method further comprises remotely initiating, by the network server, a reset for the element in the cell site, and relaying, by the network server, the diagnostics data to a server associated with a vendor of the element.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
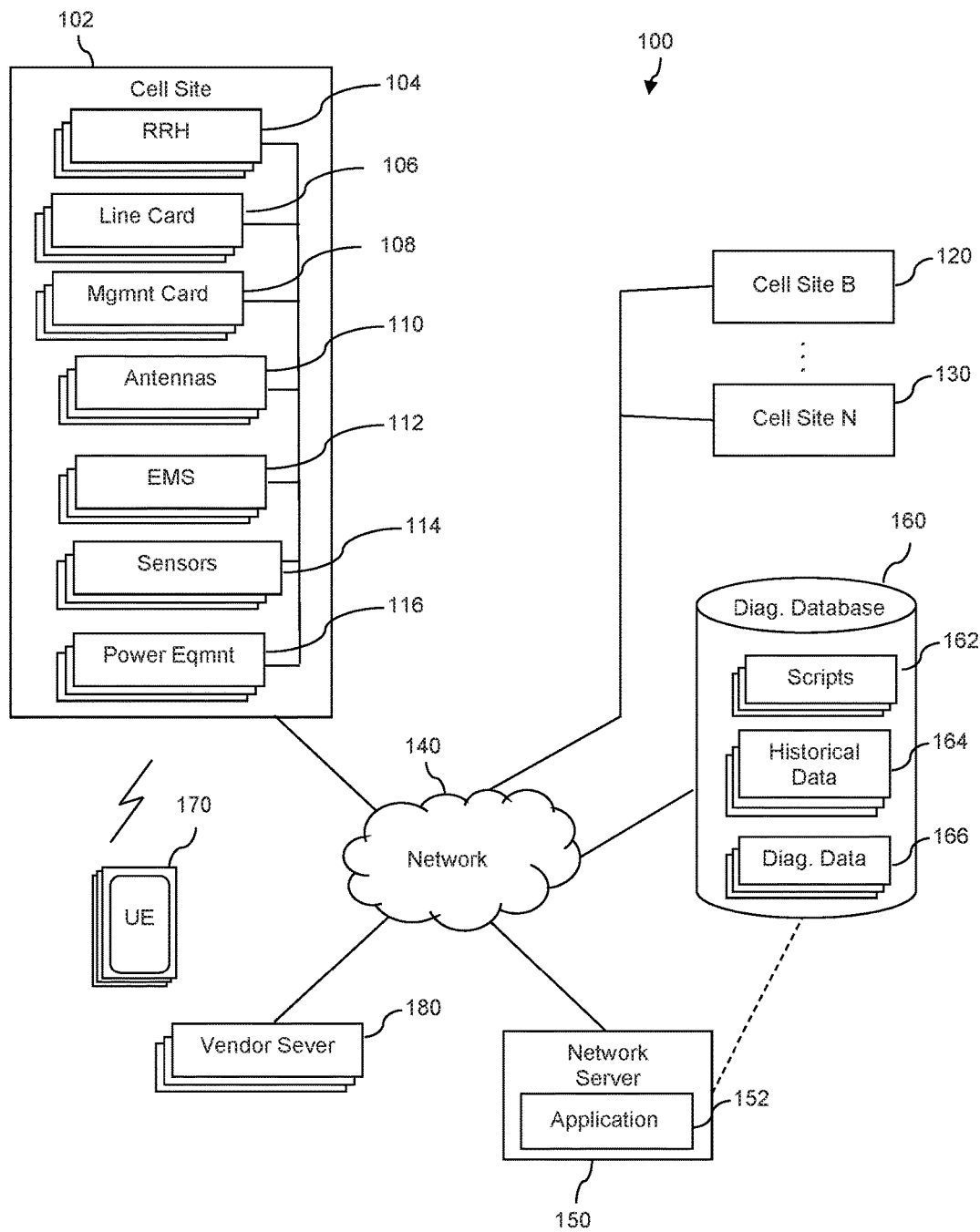
FIG. 1 is a diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Communication service providers may implement cell sites within their communication networks to provide wired and/or wireless services to their customers, and thus the communication service may depend on the proper and continuous functioning of network elements comprised within the cell sites. Each of the network elements (referred to hereafter as elements) at a cell site may correspond with a specific vendor that manufactures, services, and/or provides the element used at the cell site. Each vendor may have one or more element management systems which provide data and alerts about the element to the communication service provider via a network application on a network server. During operation, an element of the cell site may malfunction and indicate the malfunction type via an alert, alarm, and/or error message. In response to the malfunction, the element management system may be triggered to automatically reset the element, such as by resetting the alert indicating the malfunction, automatically rebooting a process executing on the element, and/or automatically power cycling the element. However, repeated automatic resets of the element may potentially mask a chronic problem or condition occurring on the element and/or across multiple cell sites within the network.

Technical challenges are presented in diagnosing malfunctions with cell sites because analysis of the malfunctions may be based on acquiring a significant amount of data about a particular element. Because a communication network may have thousands of cell sites, with each cell site comprising multiple elements, implementing a default process of automatic reporting of all data about every element experiencing a malfunction would collectively produce large amounts of data (e.g., terabytes of data) that could be cumbersome for the network server(s) to process. Additionally, pulling data about every element experiencing malfunctions may be time consuming and can disrupt communications at the cell site due to interruption of network functions.

Therefore, embodiments of the present disclosure teach systems and methods for intelligent collection and reset delay for cell sites in a network in order to improve diagnostics, identification of chronic malfunctions, and network operations. In an embodiment, a network server is in communication with one or more cell sites of a network. The network server detects a malfunction and malfunction type incurred by the element at the cell site. For example, the network server may receive an indication of an alarm or error message generated by the element and/or element management system when metrics for the cell site are out of bounds and/or a particular process of the element is not executed as expected. In some instances, the detection of the malfunction may be identified by the network server without relying on an indication of the malfunction. Rather, the network server may determine that a malfunction is occurring because the cell site is dropping calls above an acceptable defined level even though the particular element(s) may not be showing an alarm and call loads and/or capacity at the cell set are normal (i.e., not outside a defined range set for the cell site).

The network server may also detect that when the specific type of malfunction occurs, a process at the cell site (e.g., via the element management system) exists to automatically reset the element. In some instances, automatic reset may be a viable solution when malfunctions are sporadic, however, chronic malfunctions may be indicative of a larger problem. For example, an element found in multiple cell sites (such as a power amplifier) may correspond to a particular model identifier associated with a vendor. The power amplifier may be experiencing chronic malfunctions (such as inadequate voltage amplification) at one of the cell sites. The network server may determine whether the element is being (and/or at least exhibiting characteristics of being) repeatedly reset, thereby indicating a chronic malfunction. In response to determination that a malfunction is chronic, the network server may delay the automatic reset for the element(s) in the cell site so as to provide an opportunity for collection of specific data (such as the identifier of the element, time each reset occurred, date and time of installation at the cell site, time of last maintenance of software, element logs, memory dumps, and core files) which servers can use for the analysis of the root cause of the problem that led to the malfunction. The network server may then use the collected data to determine locations of other cell sites which have this element, and trigger an alert to pull data from those cell sites, request a reboot at those cell sites, and/or initiate a request for replacement of that element at the cell sites.

The network server may not capture and pull all data from the element(s) about a malfunction by default (i.e., automatically in every instance) because some malfunctions may correspond with large amounts of data and thus be time consuming and/or processing intensive for retrieval, thereby impacting the functioning of other elements in the cell site and/or other portions of the network. In some embodiments, the network server determines, based at least in part on the malfunction, an amount of disruption impact to the cell site that would be triggered if data associated with the element was pulled. For example, pulling data for some elements with a certain malfunction may be performed in less than about ten seconds, while pulling data from other elements and/or malfunctions may consume five to fifteen minutes of processing resources and downtime, thereby causing a disruption to the cell site that may affect wireless service and customer experience. Therefore, the network server may establish a defined amount of time allowed that is acceptable for the disruption impact, and may proceed with selectively pulling data from the element for diagnosis if the disruption impact is less than the defined amount.

Based on the disruption impact, the network server may pull specific data from the element that is selectively captured prior to the reset occurring. This data may be used for diagnosis and troubleshooting of the problem and may include information such as identification of the element's model type, serial number, element logs, memory dumps, core files, firmware upgrades, temperature(s) (such as of the processor in the element, within the cell site cabinet, at the cell site location, etc.), relative humidity level, location information within the network and/or geographically, frequency of reset (i.e., number of times element(s) has been reset), frequency of power cycling of element, identifier of vendor and/or service technician of the element, and other diagnostic information involved in analyzing topological relationships among elements for more rapid troubleshooting of the issue. After diagnostic data is pulled, the network server may initiate reset for the element in the cell site, and thus reset the element in the cell site. In some embodiments, the network server can build a history of reset events based on the diagnostic data, which can be used to drive a different and/or escalated action over time. For example, the network server may initially reset the element and inform the vendor of the data that was collected. But over time, the network server may take different and/or escalated actions by resetting another element in the cell site that manages and/or couples to the malfunctioning element because doing so may resolve the issue more efficiently than resetting just the malfunctioning element by itself. For example, once the automatic resets are identified as chronic and a delayed reset is initiated, the network server may monitor delayed resets by noting the identifier, time, and frequency (i.e., number of times) with which a delayed reset is implemented for a particular element in the cell site. If the network server determines that a delayed reset occurred more than a defined threshold number of times, the network server may change and/or escalate the delayed reset to include other elements at the cell site. The network server may also (or alternatively) send a request within the communication network to initiate replacement of the physical element, parts, and/or software comprised therein. Therefore, embodiments of the present disclosure can improve the functioning of the network elements and provide a more robust and reliable network by detecting chronic malfunctions more quickly, and taking action to collect specific data while minimizing potential disruptions, thereby improving element performance and customer experience on the network.

The preceding paragraphs are not intended to be limiting, but are illustrative of example benefits of the system and methods described by this disclosure according to some embodiments. Examples of systems and methods will now be described in more detail according to some embodiments of the present disclosure.

Turning now to FIG. 1, an embodiment of system 100 is illustrated. In an embodiment, system 100 comprises cell site 102 communicatively coupled to network 140. In some embodiments, the system 100 may comprise multiple cell sites, such as cell site B 120 through cell site N 130, with at least some of the cell sites 102, 120, 130 being accessible by the network server 150 via network 140. Cell sites 102, 120, 130 may comprise network elements (hereinafter referred to as elements), where the elements are operable to implement cell site functionality. In some embodiments, one or more of the elements of cell site 102 may be manufactured by different vendors, each of which may be identified by an element within the cell site 102 in order to contact a corresponding vendor server 180 with the network server 150. In some embodiments, cell site 102 may be located or otherwise positioned at a particular location to operate in conjunction with other cell sites, such as any of cell site B 120 and/or cell site N 130, so as to provide communication services (such as wireless coverage) to one or more user equipment 170.

In some embodiments, the cell sites 102, 120, 130 may be a portion of network 140 operable to provide and/or support communication service for a communication service provider associated with the network 140.

The system 100 may further comprise network server(s) 150, diagnostic database 160, one or more user equipment (UE) 170, and vendor server(s) 180, which may be communicatively coupled to the network 140. The network server 150 may be configured by an application(s) 152 via execution of a processor(s), where application 152 is stored in memory accessible to network server 150. In an embodiment, at least cell site 102 may be implemented within system 100 to facilitate and/or provide a wireless communication link to one or more UE 170 and communicatively couple it to the network 140. It is understood that, in some embodiments, the total number of UE 170 may be in the thousands and/or millions and a plurality of cell sites 102, 120, 130 may collectively be implemented to facilitate and/or provide wireless communication links and coupling to the network 140.

In an embodiment, at least the cell site 102 is configured to provide a wireless communication link to the UE 170 according to at least one wireless communication standard, such as 3GPP, Long Term Evolution (LTE), WiMAX, High Speed Packet Access (HSPA), Code Division Multiple Access (CDMA), Global System for Mobile Communication (GSM), Bluetooth, Wi-Fi, or any combination thereof. A cell site may, in some embodiments, be referred to according to the technology with which it supports, such as being referred to a Node B and/or enhanced Node B (eNB) for corresponding to an LTE technology, or a base transceiver station (BTS) for corresponding to a GSM technology. In some embodiments, one or more cell sites 102, 120, 130 may comprise elements that are distributed in location and certain elements may be co-located in physical structures separate from other elements, but communicatively coupled wired and/or wirelessly to collectively comprise the cell site. Embodiments of network 140 may comprise a public network, private network, wired network, wireless network, or any combination thereof and comply with the wireless standards discussed above. In an embodiment, the UE 170 may include a variety of form factors, such as a mobile phone (including smart phones), tablet computer, wearable computing device, digital media player, electronic book readers, notebook computer, a personal computer having an integrated or external wireless network communication device, game platforms, or other non-generic devices that may be configured for wired and/or wireless communication.

In an embodiment, cell site 102 comprises elements that include one or more remote radio heads 104, line card(s) 106, management card(s) 108, antenna(s) 110, an element management system(s) 112, cell site sensor(s) 114, and power equipment 116. In some embodiments, one or more of the cell sites 102, 120, 130 may comprise less than all of the elements illustrated in FIG. 1. In some embodiments, one or more of the cell sites 102, 120, 130 may comprise elements in addition to the elements illustrated in FIG. 1. A remote radio head 104 may include a radio frequency unit used to extend the coverage of wireless communication via the use of equipment such as analog-to digital converters and up and down converters in connection with power equipment 116. In some embodiments, line card(s) 106 comprise circuitry that is configured to interface between the network 140 and UE 170, such as by implementing analog-to-digital and digital-to-analog conversion of voice, off-hook detection, ring supervision, line integrity tests, and other functions. In some embodiments, each line card 106 may couple to a plurality of remote radio heads 104. The antennae(s) 110 may be configured to support one or more wireless communication standards at a particular frequency band, such as a frequency between 700 MHz-5200 MHZ.

In some embodiments, power equipment 116 includes at least one of power amplifier(s), power supplies, and/or a battery, along with corresponding circuitry that may couple to other elements at the cell site 102. A management card 108 includes circuitry configured that interfaces with other elements at the cell site (e.g., line cards 106, remote radio heads 104, power equipment 116, sensors 114, etc.) for secure monitoring and control of at least some elements at the cell site, and may send information to network server 150 for display on a user interface. In some embodiments, the management card 108 couples to sensors 114 to obtain sensor data. For example, sensors 114 may include a temperature sensor and/or humidity sensor, and thus the sensor data may include temperature and/or humidity levels. In some embodiments, sensors 114 include a position sensor (e.g., a global positioning system receiver and/or other trilateration application for determining location) to report and relay the geolocation of the cell site 102 and/or its elements relative to other cell sites (e.g., 120, 130) within the network 140 and/or on a map. The management card 108 may facilitate monitoring of sensor data and diagnostic data received from other elements (e.g., monitoring and reporting information about power equipment 116). The element management system 112 may include an application stored in non-transitory memory and, upon execution, configures a processor that collects information from the management card 108 and other elements of the cell site 102 to interact and send information (e.g., malfunction data, diagnostics data, sensor data, etc.) to the network server 150 for diagnostics and reporting. In some embodiments, element management system 112 comprises at least the management card 108. The element management system 112 may obtain location information from the sensors 114, which the network server 150 may obtain and use in cell site diagnostics.

In some embodiments, elements of a cell site (e.g., one or more of remote radio heads 104, line card 106, management card 108, antennas 110, power equipment 116, etc.) may be exposed to harsh environmental conditions (e.g., sun, wind, rain, lightening, humidity, etc.) due to being located at or near the top of a tower, elevated structure, and/or other locations exposed to the environment. A communication provider may seek to ensure that cell sites and their elements are operating within the bounds of expected performance in order to ensure proper functioning of a wireless and/or other communication service. However, in some embodiments, physical access to the elements of a cell site (e.g., for repairs and/or replacement of the elements) may be challenging because of their location, such as being on a tower, mountain, building, and/or other location. As such, detection and determination of chronic malfunctions within elements of cell sites (e.g., 102, 120, 130) may lead to less waste of processor runtime and improve use of processor resources while mitigating potential disruptions on the network 140.

Therefore, in an embodiment, the system 100 may comprise network server 150 configured by network application 152 to support the detection, analysis, and correction for chronic malfunctions occurring at cell sites 102, 120, 130. In some embodiments, at least a portion of the network application 152 may be distributed across multiple servers and/or executed by a processor of a cell site, such as one of 102, 120, 130. Each cell site (e.g., 102, 120, 130) may be identified by the network server 150 via a cell site identifier, and each of the elements within a cell site (e.g., elements 104-116 within cell site 102) may have a serial number(s) and model number(s) (corresponding to a model type) that can be reported to the network server 150. Each element of a cell site (e.g., 104-116 of cell site 102) may have alarms, alerts, and/or other signals that identify a malfunction incurred by the element. For example, a malfunction may include alarms above a threshold, metric(s) being out of bounds from expected operation (i.e., is above and/or below predefined levels for the element), repeated dropping of calls despite being within the bounds of expected communication volume and signal strength, power fluctuations beyond a defined threshold, and/or repeated changing of serial number for an element without the model number changing.

Each malfunction incurred and/or occurring on an element (e.g., any of 104-116) may correspond with a particular malfunction type. The network server 150 may be configured by application 152 to detect a malfunction and malfunction type from an element (e.g., one or more of elements 102-116) in a cell site (e.g., 102) of network 140. In an embodiment, a malfunction type comprises at least one of the malfunction corresponding with an automatic reset for the element and the malfunction not corresponding with an automatic reset for the element, or both. For example, automatic reset for the element may include at least one of resetting the malfunction indicator (e.g., resetting the alarm), restarting a process executing on the element, and resetting a portion and/or the entire element by power-cycling the element. Examples of a malfunction that does not correspond with an automatic reset for the element may include when an element (e.g., a line card or antenna) loses power and is non-responsive, which in turn indicates a malfunction to the network server 150 and/or other database for repair or replacement. Another example of a malfunction that does not correspond with an automatic reset may include when an operating temperature of an element passes a defined threshold corresponding to decreased performance, and the default response is initiating another process on an element (e.g., initiating a heating ventilation and air condition system to reduce the temperature of the cell site, or diverting incoming data to another element to reduce the load on a processor of the element).

Network server 150 receives, requests, and/or otherwise obtains information from the cell sites 102, 120, 130 by interacting with one or more of the particular elements and/or via the element management system 112. In some embodiments, the element management system 112 may be configured to automatically trigger a reset for one of the elements (e.g., 104-106) in response to malfunctions based on a reset table stored in memory accessible by the network server 150 (e.g., in the application 152) and/or accessible via network 140. For example, the reset table may identify one or more malfunctions as having a malfunction type that corresponds with automatic reset, thereby indicating that an automatic reset should be implemented when the malfunction occurs. The element management system 112 may inform network server 150 of the malfunction and malfunction type, thereby allowing network server 150 to detect the malfunction. The system 100 may also include a diagnostic database 160 coupled to the network 140 and/or network server 150. The network server 150 may determine, such as via execution of the network application 152, a serial number and/or model number from the message sent by the element management system 112, and in response the network server 150 may identify and/or instantiate at least one of a plurality of scripts 162 from diagnostic database 160. In some embodiments, one or more of the plurality of scripts 162 corresponds to the element experiencing the malfunction (e.g., remote radio head 104 or any other element). The memory of diagnostic database 160 may comprise scripts 162, historical data 164, and/or diagnostic data 166 pulled from elements at cell sites (e.g., 102, 120, 130). The one or more scripts 162 may configure the network server 150 to identity how frequently the malfunction occurs for the element and whether such malfunction is chronic.

In an embodiment, the network server 150 configured by network application 152 may determine the frequency (e.g., number of times) a malfunction has occurred for the element in the past by analysis of historical data 164. For example, a malfunction with a remote radio head 104 may be an alarm and/or performance alert as to the functioning of one or more specific operating frequencies (e.g., supporting GSM, LTE, etc.) and how often the malfunction occurs may be recorded. The network server 150 may store historical data 164 about the element (e.g., remote radio head 104) each time a malfunction occurs and denote whether the malfunction resulted in an automatic reset. Then, each time a malfunction occurs with the remote radio head 104 (or any other element at cell site 102), the network server 150 may check to see how frequently the malfunction occurred and/or how often a reset was initiated due to the malfunction. The network server 150 may compare, with another element at the cell site 102 and/or within the network 140, the number of times the malfunctioning element has been previously reset over a predefined time duration (e.g., the past week, month, 90 days, etc.) in response to the malfunction. For example, a remote radio head 104 may be malfunctioning and the network server 150 may compare how often that malfunction has previously occurred at cell site 102 with how often a similar remote radio head (i.e., remote radio head made by same manufacturer and having same version of software and/or hardware) at another cell site (e.g., 120 and/or 130) has malfunctioned.

In some embodiments, the network application 152 configures a processor of network server 150 to build a threshold corresponding to the number of times (i.e., frequency of malfunction) a reset can be automatically initiated over the predefined time duration for the element experiencing a malfunction, and above that threshold, the malfunction is deemed to be chronic. Put simply, if a particular element (e.g., one of elements 104-116) has been reset above the threshold number in response to the malfunction, the network server 150 may determine that the malfunction is chronic and instruct the cell site (e.g., one of 102, 120, 130) to delay automatic reset.

In an embodiment, the network server 150 may detect a malfunction and determine that it is chronic by comparing and analyzing how frequently the serial number changes on the element without the model number changing. This may be indicative of an issue with the type of element, such as faulty hardware, firmware, and/or software of the element. In an embodiment, the network server 150 may initiate a request to replace and/or repair the malfunctioning element at the cell site. For example, the network server 150 may generate a service message to vendor server 180, where the service message comprises the identification of the element, the frequency with which it has malfunctioned, and an instruction to generate a replacement ticket such that the vendor server 180 prompts a vendor technician (via their electronic device) to repair and/or replace the element at the cell site.

The network server 150 may delay automatic reset for the malfunctioning element in the cell site (e.g., any of elements 104-116 at cell site 102). In some embodiments, delaying automatic reset of the element may be in response to detecting the malfunction and/or identifying that the malfunction is chronic. In an embodiment, the network server 150 may delay automatic reset for the element for a set interval so as to give the network server 150 enough time to decide if at least some communication service would be disrupted by pulling information (e.g., diagnostic data, sensor data) from the malfunctioning element prior to reset, and if so, determining whether to proceed with pulling the information. In an embodiment, the network server 150 may delay automatic reset for the element (e.g., remote radio head 104) in the cell site (e.g., 102) by instructing the cell site (e.g., via element management system 112 of cell site 102) to pause automatic reset until the network server 150 provides instructions to proceed. The network server 150 may, in some embodiments, delay automatic reset by interrupting the automatic reset process and instantiate a time delay (e.g., 30 seconds, one minute, five minutes, etc.) that is configured to hold the processor of the element and allow the network server 150 to determine whether the malfunction is chronic and/or whether to pull information from the element. In an embodiment, the element management system 112 may proceed to reset the malfunctioning element (e.g., any of elements 104-116) if the network server 150 does not reply with instructions to proceed or not proceed with automatic reset within the time delay. In some embodiments, the network server 150 may delay automatic reset of the malfunctioning element prior to determining that a malfunction is chronic, and pull information after determining that the malfunction is chronic and/or determining that an amount of disruption impact is within a boundary marked as acceptable.

If network server 150 were to try and pull diagnostic data and/or sensor data each time a malfunction occurs for every element across the entire network 140 (i.e., irrespective of whether the malfunction is chronic), then the resulting amount of data may overwhelm the network 140 and slow wireless service. Thus, in an embodiment, the network server 150 may refer to a table having historical data 164 in diagnostic database 160 in order to determine the time period (i.e. amount of time) involved in pulling diagnostic data about the element experiencing the malfunction and resetting the element. Put simply, a disruption impact corresponds with an amount of disruption that would be caused to the cell site (e.g., 102) due to at least pulling select information for diagnostics (i.e., diagnostic data) from the element (e.g., remote radio head 104 and/or any other element) and/or resetting the element. In some embodiments, the disruption impact may also include a determination as to whether the element has redundancies, such as whether there are multiple elements (e.g., multiple remote radio heads 104, line cards 106, antennas 110, etc.) that can act as a backup during the malfunction and reset. Data about malfunctions occurring on one of the elements may be useful to the network server 150 and/or vendor server(s) 170 for diagnostic purposes; however, the diagnosis of each malfunction may correspond with a specified amount of data, which takes a certain amount of time to acquire from the cell site 102.

For example, a malfunction from a remote radio head 104 may have a malfunction type that corresponds with automatic reset and have a disruption impact amount of about 30 seconds with multiple redundancies. Comparatively, in an embodiment, a different malfunction from a line card 106 may have a malfunction type that corresponds with automatic reset and may have a greater disruption impact amount of fifteen minutes and no redundancies. This may be because, in some embodiments, there may be a limited number of line cards 106, and thus even if the time period involved in pulling diagnostic data and resetting the element was the same (i.e., 30 seconds irrespective of the element), the disruption impact may be greater for malfunctions occurring on elements that have less and/or no redundancies.

In some embodiments, the network server 150 determines an amount of disruption impact by analyzing one or more of the following factors: determining a time period involved in pulling the diagnostic data; determining the time involved in resetting the element (i.e., down-time for the element while reset occurs); whether the chronic malfunctioning element has any redundancies and if there are redundancies, the time it takes to transfer and/or route data streams and/or calls to the other element; the amount of call and/or data volume handled by the malfunctioning element. The network server 150 may assign a time value to each of these factors (e.g., in seconds, minutes, etc.) due to the amount of time it would take the network server 150 to initiate and/or instantiate scripts (e.g., scripts 162) and threads to reroute the network functions to alternate elements (e.g., from one remote radio head 104 to another) while information is pulled and the malfunctioning element is reset. The network server 150 may add the value of all factors considered and create a boundary (e.g., in a table stored in non-transitory memory) such that an amount of disruption impact at and/or above the boundary may signal to the network server 150 that further delay of automatic reset and pulling the diagnostic information would use up too much processor and memory resources at the cell site (e.g., 102) and/or the network server(s) 150. If the amount of disruption impact is below the boundary, then the network server 150 may proceed with obtaining information from the malfunctioning element.

In some embodiments, the network server 150 may take action to improve the functioning of the cell site (e.g., 102) and mitigate the disruption to communication services handled by the malfunctioning element. For example, the network server 150 may determine that the amount of disruption impact may be reduced to an acceptable level (i.e., below a determined boundary) such that pulling information for diagnostic purposes would be advantageous to network performance. Thus, the network server 150 may perform alterations to communication flows in the network 140, such as altering use of a cellular frequency by calls and/or data streams traversing the cell site (e.g. 102). For example, this may include switching one or more remote radio heads 104 to implement GSM frequencies for one or more UE 170 to use instead of LTE frequencies. In some embodiments, the network server 150 may alter routing of calls and/or data streams through another element at the cell site 102. For example, cell site 102 may comprise multiple line cards 106, with one line card 106 experiencing a malfunction. The network server 150 may alter communication flow from the malfunctioning line card 106 and toward the other non-malfunctioning line cards 106 that do not indicate a malfunction. In some embodiments, the network server 150 may alter routing of at least some calls and/or data streams to another cell site(s), such as from cell site 102 to one or more cell sites 120, 130.

The network server 150 may be configured by a network application 152 to selectively pull certain information for the malfunctioning element prior to the element being reset. As discussed above, in some embodiments, the network server 150 may pull information from the element based on and/or in response to the amount of disruption impact being below a boundary (which may be stored in non-transitory memory of diagnostics database 160). The network server 150 may be configured to selectively pull less than all information from the malfunctioning element for use in diagnosis. This is because although the amount of data from one element may be relatively small (e.g., less than one hundred megabytes), this transfer of data takes time and may increase the down-time (i.e., time with which the element is not put back into use following a reset) at the cell site. Additionally, when viewed from a larger perspective, chronic malfunctions may result in pulling data multiple times for the same element, and when this amount of data is multiplied across multiple cell sites (i.e., tens of thousands of cell sites) the amount of data may collectively total tens and/or hundreds of terabytes of information.

As such, the network server 150 may be configured to selectively pull certain information from the cell site 102 about the malfunctioning element (e.g., diagnostics data that shows the context of the malfunction). This may reduce down-time by decreasing the time it takes to obtain information used in diagnosis of the malfunction. For example, the information that is selectively pulled may include diagnostics data and/or sensor data, but exclude at least some or all other data generated by the element. In some embodiments, diagnostics data (which may be stored as diagnostics data 166 in database 160) may include one or more of: identifiers of the malfunction, malfunction type, time-stamp, manufacturer of the element, firmware information, software release version information, error prompts, identifications of processes occurring leading up to the malfunction, volume of data handled by element at time of malfunction, identification of whether malfunction is expected to occur when certain traffic and/or signals traverse the element, logs of past malfunctions, frequency of power cycling of element(s) at cell site 102, proximity to other elements belonging to competitors that are servicing another communication service, or any combination therein.

In some embodiments, sensor data (which may be stored as part of and/or separate from historical data 164 and/or diagnostics data 166) may include one or more of temperature of the element at time of and/or leading up to malfunction, temperature inside enclosure housing the element(s), temperature at geolocation of element, humidity levels (i.e., relative humidity) inside an enclosure housing the element, humidity levels at geolocation of element, geolocation of element(s) and/or cell site. The network server 150 may request, pull, and/or receive information such as diagnostics data and/or sensor data from memory at and/or coupled to the element for the cell site. Although system 100 depicts scripts 162, historical data 164, and diagnostics data 166 as one block, it is understood that each malfunctioning element may corresponding with its own set of scripts 162, historical data 164, and/or diagnostics data 166.

In some embodiments, the network server 150 may diagnose one or more malfunctions for one or more elements by building historical data 164 for each malfunction and/or element such that correlations can be determined between disparate data sets. In some embodiments, the network server 150 may use the determined correlations to preemptively diagnose elements in a network by identifying which elements will experience chronic malfunctions, even though they may not be currently and/or presently experiencing a malfunction. For example, the network server 150 may, over time, determine correlations between identifiers of maintenance tech servicing cell sites and malfunctions. Other examples of correlations determined by the network server 150 may be identified between one or more of: manufacturer of the element, firmware, software release versions, geographic location, altitude, humidity, temperature, power cycling, total duration the element has been installed at the cell site in the network, proximity to other equipment belonging to competitors, and/or any other information pulled and included in the diagnostics data and/or sensor data. By this, the network server 150 may determine what malfunctioning remote radio heads (e.g., 104) may be due to excess power cycling of a back-up battery, and this may be across multiple remote radio heads in a specific geographic location (e.g., across all of southern Texas). Another example may be the network server 150 determining a correlation between the manufacturer of an air conditioning system for an enclosure at the cell site and excess humidity inside enclosures housing malfunctioning elements, thereby indicating that the air conditioning system is not functioning properly across one or more cell sites. In some embodiments, the network server 150 may trigger the air conditioning system at the cell site experiencing high humidity, and other cell sites within a defined geographic location, to power-on at a lower temperature and/or relative humidity level, thereby mitigating chronic malfunctions and improving the functioning of the network 140.

The network server 150 may also be configured to remotely initiate reset for the malfunctioning element at the cell site (e.g., initiate reset for remote radio head 104 at cell site 102). In some embodiments, remotely initiating a reset by the network server 150 may include sending a trigger to the cell site 102 which releases a processing hold on the automatic reset of the malfunctioning element. In some embodiments, the reset may reboot a processing thread to restart the process of the element, reboot an operating system managing the element, and/or power-cycle the circuitry of the element. In an embodiment, the network server 150 initiates a reset by deactivating the malfunctioning element and sending a request for manual inspection of connecting cables and/or communication interfaces prior to bringing the element back into operation. The network server 150 may pull performance data from a data store, analyze the performance data to determine historical network traffic volume flows with reference to days and times of day, and schedule the delayed reset for the element to be initiated at times of the day in which network traffic is determined by the network server 150 to be at a lower volume on the element than the amount of network traffic experienced during the time when the malfunction was detected.

The network server 150, in some embodiments, may identify when the pulling of information about the element has completed, and in response to the information (e.g., the diagnostic data and/or sensor data) being pulled, the network server 150 may initiate a reset sequence for the element at the cell site (e.g., one of elements 104-116 at cell site 102). A reset sequence may selectively reset a plurality of elements within the cell site in a specific order such that each successive reset may be of an element in the cell site that controls at least one other elements that was previously reset. For example, the reset sequence may include the network server 150 first initiating a reset for a chronically malfunctioning element (e.g., a remote radio head 104) and then checking (e.g., sampling data every 10 seconds in one instance, or 5 times per second in a different instance) if the malfunction reoccurs within a defined time after the first reset (e.g., within a day, week, month, etc. after the first reset). Then if the malfunction reoccurs, the network server 150 may pull new diagnostics data 166 about the malfunction element (e.g., 104) and initiate a reset for both the chronically malfunctioning element (e.g., 104) and a second element that controls and/or is coupled to the first malfunctioning element (e.g., a line card 106 coupled to one of the remote radio heads 104).

For example, a remote radio head 104 may malfunction again and in response, the network server 150 may delay automatic reset of the remote radio head 104 and reset both the remote radio head 104 and a line card 106 that controls and/or couples to the remote radio head 104. In some embodiments, the network server 150 may determine, after another defined time period, that if the first element malfunctions again (e.g., remote radio head 104) and resetting the line card 106 did not relive the malfunction, then network server 150 may reset a third element that may control one and/or both the first and second elements, such as resetting a management card 108 that controls one and/or both remote radio head 104 and/or line card 106.

In some embodiments, the network server 150 may determine that because the chronic malfunction continues to surface for one or more elements at a cell site (e.g., elements 104-116 at cell site 102), the network server 150 diverts network traffic away from the cell site 102 and then initiates a reset of the entire cell site (i.e., resets all elements at a specific cell site). The network server 150 may log when a reset occurs in response to a malfunction—whether it be automatically and/or by remote initiation by the network server 150. The network server 150 may store the log of when resets occur with historical data 164 and associate that log with the malfunctioning element.

In some embodiments, the network server 150 may send and/or notify a vendor server(s) 180 of malfunction due to the associated vendor having a relationship with the malfunctioning element. For example, the network server 150 may determine, based on the pulled diagnostic data, that a particular version of firmware is present on all elements experiencing malfunctions, but an updated version of firmware on similar element (i.e., elements at other cell sites that are made by the same manufacturer and/or have the same model number) are not experiencing chronic malfunction. The network server 150 may send trends to the vendor server 180 about malfunctions occurring on one or more element based on the pulled information.

The trends may show increased frequency of the malfunction occurring on the element over a given time based on the diagnostic data that was pulled. In some embodiments, the vendor server 180 may diagnose and determine causes for the chronic malfunctions, and in response, send a reply message back to network server 150 with actions to implement to address the chronic malfunction. In an embodiment, the network server 150 and/or vendor server 180 may initiate a request to a trouble ticket database to instantiate a record to repair and/or replace the malfunctioning element, such as by putting the element identifier on a technician's maintenance queue. In some embodiments, the network server 150 may instantiate a request and/or trigger installation of a firmware update and/or software update to the non-transitory memory of an element (e.g., one of the elements 104-116) in response to the pulled information and diagnosis of the chronic malfunction. In some embodiments, the network server 150 may determine that humidity levels are too high for particular enclosures housing the elements at a cell site (e.g., 102), and thus may trigger a heating ventilation and air conditioning system to activate, thereby reducing the relative humidity levels. In some embodiments, the network server 150, in response to diagnosis of the chronic malfunction, may activate one or more backup elements at site in addition to initiating the reset of the malfunctioning element in order to better handle communication traffic and/or data loads at the cell site 102. In an embodiment, the network server 150 may instantiate request to install more elements at the cell site 102 and inform a vender server 180 of the request. In some embodiments, the network server 150 may monitor the element in the cell site 102 that was reset remotely via the network server (i.e., the element that experienced the delayed reset), and in response to the network server determining that a number of times that the element undergoes a delayed reset (i.e., the number of times the network server 150 delays the element from being reset) exceeds a predefined limit, the network server may change the reset that is taken at the cell site 102. For example, the reset may be changed from being delayed to at least one of: remotely initiating reset of another element at the cell site 102; initiating a replacement of the element via a message to the server 180 associated with the vendor; reallocating processes from executing on the element at the cell site 102 to another element that is operable to handle the element functions, or any combination therein.

In some embodiments of system 100, the network server 150 may be performing intelligent reset delays in real time, instead of waiting for the scheduled reporting of information from cell site 102, which may occur periodically such as once every 12 hours, once a day, once a week, and/or once a month. Said in another way, the term real-time as used herein means that the information obtained by the network server 150 is detected, determined, monitored, measured, collected, transmitted, and/or analyzed as events happen prior to—versus performing one or more of these actions in a batch processing mode of operation—a scheduled processing time defined by the cell sites. In an embodiment, real-time detection, determining, pulling, measurement, collection, initiating, transmission, and analysis of information related to an event may take place in less than a defined time period, such as but not limited to less than 10 seconds, in less than one minute, in less than five minutes, or in less than fifteen minutes.

Figure 2:
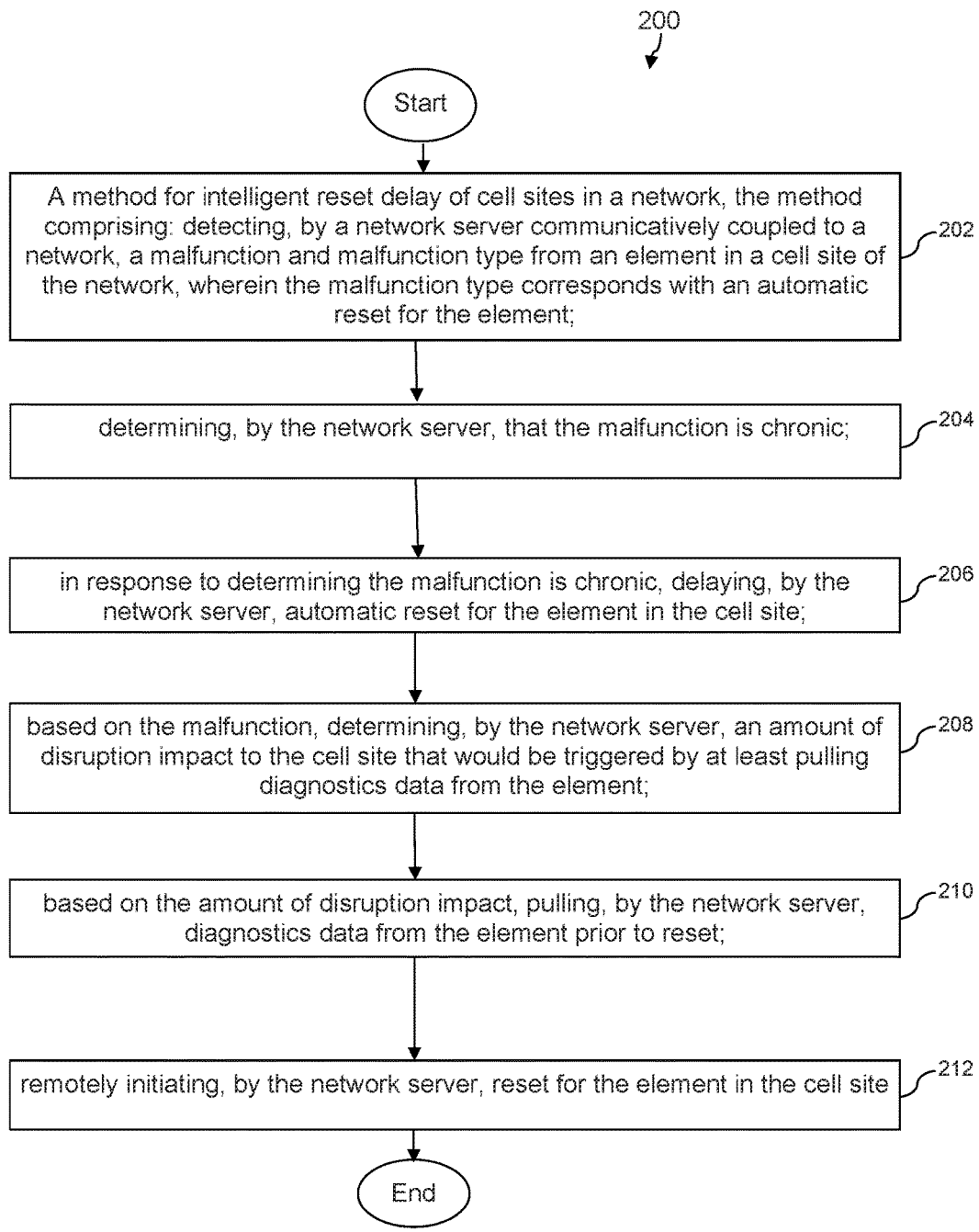
FIG. 2 illustrates an example method according to an embodiment of the disclosure.
Figure 3:
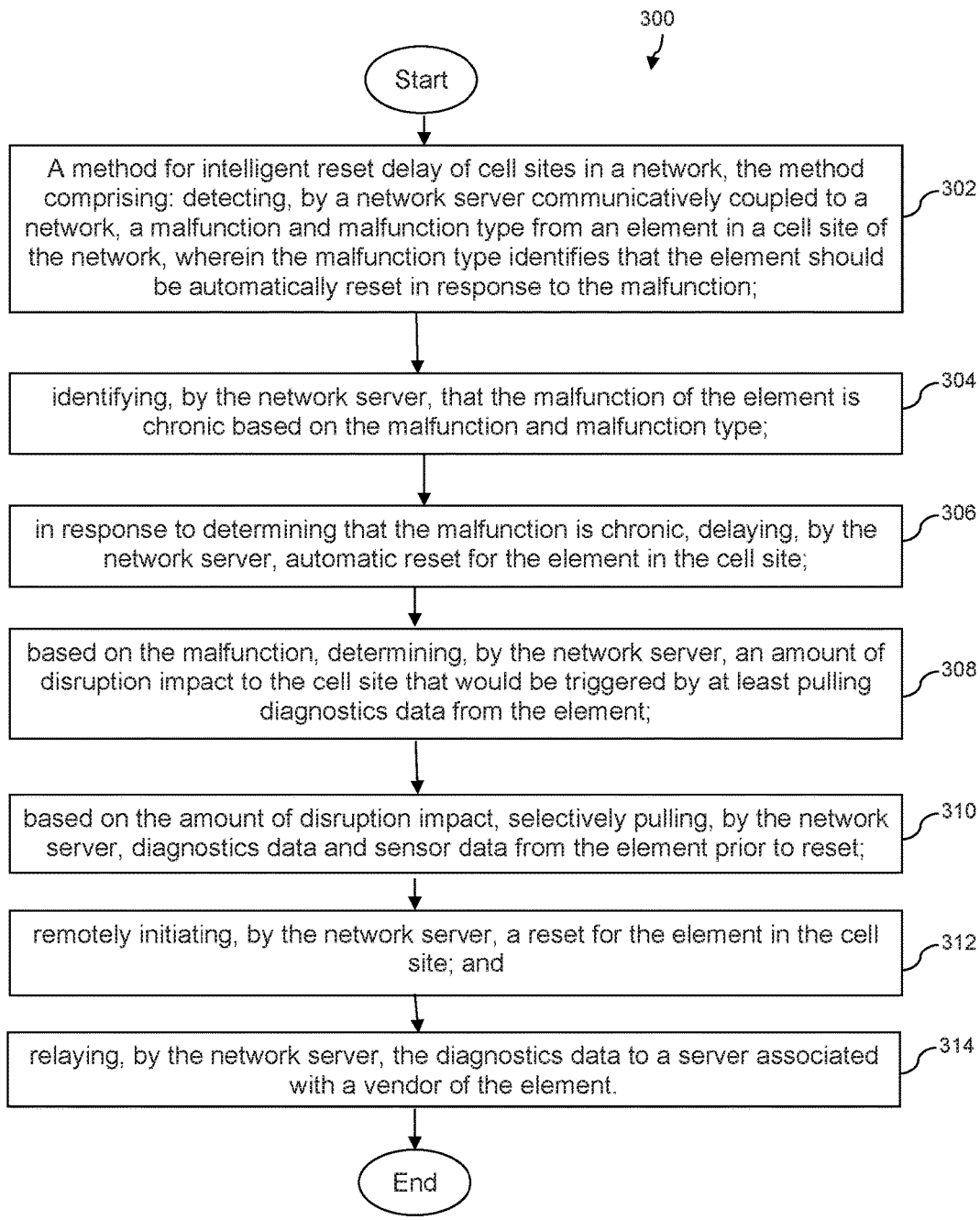
FIG. 3 illustrates an example method according to another embodiment of the disclosure.

FIGS. 2 and 3 are flowcharts of example method 200 and method 300, respectively, for intelligent reset delay of cell sites in a network. The methods 200 and 300 may be implemented, in whole or in part, by embodiments disclosed herein, such as system 100 of FIG. 1, or another suitable non-generic device and/or non-generic system such as discussed with respect to FIGS. 4-7. For this and other processes and methods disclosed herein, the operations performed in the processes and methods may be implemented in differing order. Furthermore, the outlined operations are only provided as examples, and some of the operations may be optional, combined into fewer operations, supplemented with other operations, or expanded into additional operations without detracting from the essence of the disclosed implementations.

Turning now to FIG. 2 with reference to features of an embodiment of FIG. 1, a method 200 for intelligent reset delay of cell sites in a network is disclosed. At step 202, the method 200 comprises detecting, by a network server communicatively coupled to a network, a malfunction and malfunction type from an element in a cell site of the network. In some embodiments, an element may be one of a plurality of elements in the cell site of the network. An element may include at least one of a remote radio head, a line card, a management card, and a power equipment (e.g., power supplies, power amplifiers, back-up batteries, etc.). For example, network server 150 may be detecting a malfunction in one of the elements in cell site 102, such as a malfunction experienced by line card(s) 106, and the malfunction type indicates to network server 150 that an automatic reset should take place for the element in response to the malfunction. In some embodiments, an element (e.g., 104-116 of cell site 102) may be indicating multiple malfunctions, and the network server 150 is detecting which of those multiple malfunctions has a malfunction type that corresponds with an automatic reset. This may improve the functioning of the non-generic particular machines involved, such as network server 150, UE 170, and/or cell sites 102, 120, 130, by efficiently managing processor resources.

The method 200 continues at step 204 with the network server determining that the malfunction is chronic. In an embodiment, the network server may determine that the malfunction is chronic by first determining a number of times the element has been previously reset (within a predefined time duration, such as over the past 30 days, 90 days, etc.) in response to the malfunction occurring at the element. The network server may also compare, with another element in the network, the number of times each element has been previously reset (within the same predefined window of time, such as over the past 30 days, 90 days, etc.) due to the same malfunction occurring at each element, and this comparison may be with another element at the cell site (such as another remote radio head 104 at cell site 102) and/or the same type of element at different cell site in the network (such as a remote radio head at cell sites 120 and 130 having the same model number and manufactured by the same vendor). In some embodiments, the determination of the malfunction being chronic may also include building a threshold corresponding to the number of times a reset can be automatically initiated over the predefined time duration (e.g., threshold ten resets over a two week period) in response to the malfunction, where a number below the threshold may not be indicative of a chronic malfunction, but at or above the threshold may be deemed to be chronic (i.e., at or above ten resets within a two week period). As such, the network server may then determine that the malfunction is chronic in response to the element exceeding the threshold.

The method 200 may continue at step 206 such that in response to determining that the malfunction is chronic, the network server delays automatic reset for the element in the cell site experiencing the malfunction. In an embodiment, the network server may identify another element of the same type (e.g., within the same cell site or a different cell site) that is also experiencing malfunctions but this element might not yet be classified as experiencing chronic malfunctions because it is near, but below, the threshold (i.e., within one, two, five or another defined number of automatic resets). In some embodiments, the method 200 may include the network server flagging the other element (i.e., exhibiting malfunctions but not yet chronic), delaying automatic reset, and pulling diagnostic data from this other element as well. In some embodiments, the network server may delay automatic reset and pull information (e.g., diagnostic data, sensor data, and/or information) for only those elements that exhibit chronic malfunctions, whether they be at the same and/or different cell site.

The method 200 may continue at step 208 with the network server determining, based on the malfunction, an amount of disruption impact to the cell site that would be triggered by at least pulling diagnostics data from the element. In some embodiments, determining an amount of disruption impact may include one or more of: determining a time period involved in pulling the diagnostic data; determining the time involved in resetting the element (i.e., down-time for the element); whether the chronic malfunctioning element has any redundancies and if there are redundancies, the time it takes to transfer and/or route data streams and/or calls to the other element; the amount of call and/or data volume handled by the malfunctioning element. The network server may assign a time value to each of the factors (e.g., in seconds, minutes, etc.) due to the amount of time it would take the network server to initiate and/or instantiate scripts and threads to reroute the network functions to alternate elements while information is pulled and the malfunctioning element is reset. The network server may add the value of all factors considered and create a boundary (e.g., in a table stored in non-transitory memory) such that an amount of disruption impact at and/or above the boundary may signal to the network server that further delay of automatic reset and pulling the diagnostic information would use up too much processor and memory resources. The network server may also consider the amount of downtime (i.e., via total value of the disruption impact) that will be incurred by delaying reset of the element and/or taking the element out of server. In this case (i.e., at and/or above the boundary), embodiments of method 200 include the network server releasing the delay on the automatic reset for the malfunctioning element, and instantiating a record in a database (e.g., a trouble ticket record for repair and/or replacement), thereby allowing the element to correct and/or resume operations while a more permanent solution is identified.

In some embodiments, the method 200 may include the network server analyzing the amount of the disruption impact, and in response to the amount of disruption impact, the network server alters at least one of: use of a cellular frequency by calls traversing the cell site (e.g., switching calls routed through the cell site to 1700 MHZ from 1800 MHZ because at least some portion of a remote radio head is malfunctioning); routing of calls through another element at the cell site (e.g., routing calls from UE 170 from a first remote radio head to a second remote radio head at cell site 102); and routing of calls to another cell site (e.g., routing calls from UE 170 from cell site 102 to cell site 120 and/or 130). In some embodiments, the altering processes may be in response to the amount of the disruption impact being at least one of: below the boundary for disruption impact, and at or above the boundary for disruption impact.

The method 200 may continue at step 210 with the network server pulling diagnostics data from the element prior to reset. The amount and type of information being pulled may be based on the amount of disruption impact, such as selectively pulling identifiers of the element (e.g., serial numbers and model numbers), diagnostic data (e.g., error codes, alarms, malfunction information, element logs, memory dumps, and core files), and/or sensor data, while leaving the remaining data created by the element at the cell site in order to decrease down-time and increase the speed with which the malfunctioning element can be reset and put back into use.

The method 200 may continue at step 212 with the network server remotely initiating reset for the element in the cell site. In an embodiment, the remote initiation of the reset may release a hold on the element for reset and thus allow the automatic reset to resume for the element. In an embodiment, the method 200 may also include a network server initiating, in response to pulling the diagnostic data, a reset sequence that selectively resets a plurality of elements within the cell site. For example, the reset sequence may include first resetting the chronically malfunctioning element (e.g., a remote radio head), checking if the malfunction reoccurs within a defined time after the first reset (e.g., within a day, week, month, etc.), then if the malfunction reoccurs, resetting a second element in addition to the chronically malfunctioning element (e.g., an element that controls and/or is coupled to the first malfunctioning element). For example, a remote radio head may malfunction again and in response, the network server may delay automatic reset of the remote radio head and reset a line card that controls and/or couples to the remote radio head, while also resetting the remote radio head. After another defined time period, if the first element malfunctions again, the network server may then reset a third element that may control both the first and second elements, such as resetting a management card that controls two remote radio heads. In some, albeit rare circumstances, the network may determine that because the chronic malfunction continues to surface, the most prudent response is to divert network traffic away from the cell site and reset the entire cell site.

In some embodiments, the method 200 may continue with the network server diagnosing the chronic malfunction, such as by analyzing a diagnostic map in a diagnostic data base and identifying a solution for the chronic malfunction based on the diagnostic data pulled from the malfunctioning element. The network server may send the information to a server of a vendor associated with the element, such as information pulled from the element (e.g., diagnostic data, sensor data, etc.), trends about the malfunction of the element based on the diagnostic data, and/or actions that a server(s) and/or technician(s) may implement to the cell site and/or element in order to further address the malfunction.

Turning now to FIG. 3, with reference to features of an embodiment of FIG. 1, a method 300 for intelligent reset delay of cell sites in a network is disclosed. The method 300 includes step 302 in which a network server communicatively coupled to a network is detecting a malfunction and malfunction type from an element in a cell site of the network. In an embodiment, the malfunction type for the detected malfunction identifies that the element should be automatically reset in response to the malfunction. The element that is malfunctioning may be one a plurality of elements at a cell site of the network. In some embodiments, elements at a cell site (including the malfunctioning element) may comprise one or more of: a remote radio head, a line card, a management card, a power equipment, and a heating ventilation and air conditioning system.

The method 300 also includes step 304 of identifying, by the network server, that the malfunction of the element is chronic based on the malfunction and malfunction type. In some embodiments, the network server may identify that the malfunction is chronic due to identification that an identifier of the element has changed a plurality of times despite the model type of the element staying the same. Put simply, the model type may correspond to a version number of hardware and/or software associated with the element, and the technicians may have replaced the element with a duplicate that has the same version of hardware and/or software. The network server may identify that a newer model type of the element (i.e., version 2.0 instead of version 1.0 of the hardware and/or software made by the same or different vendor) is not associated with malfunctions, and thus may prompt a vendor server that the element without malfunctions should be the next replacement. This may be determined by reference to a diagnostic database and historical data collected over time. In some embodiments, the network server may also identify that one or more elements at the same or different cell site will likely suffer from a chronic malfunction in the future despite not alerting the network server of a malfunction at the same time. For example, the network server may determine that the element, such as a remote radio head, at a first cell site is chronically malfunctioning, and this malfunctioning remote radio head has hardware version number 2.0 and software version 3.0.

The network server may identify other cell sites have also have remote radio heads with hardware version number 2.0 and software version 3.0, even though the other cell sites may have not yet reported malfunctions to the network server. By this, the network server may pre-emptively (i.e., before a defined schedule date for maintenance and/or replacement of an element) initiate a reboot for the elements at each of the cell sites (including those not yet reporting malfunctions), push a software update, and/or generate a request for replacement of the malfunctioning elements. As such, in some embodiments, the network server may consecutively and/or concurrently execute steps of method 300 with another element in a cell site that it determines to have a likelihood of chronic malfunction as well.

The method 300 also includes step 306 where the network server, in response to determining that the malfunction is chronic, is delaying automatic reset for the element in the cell site. In an embodiment, the network server may instantiate a hold on a processor at the cell site that controls automatic reset of the element to clear the malfunction.

The method 300 may also include step 308 where the network server, based on the malfunction, is determining an amount of disruption impact to the cell site that would be triggered by at least pulling diagnostics data from the element. In some embodiments, the network server may identify the element via an identifier (e.g., a serial number and/or model number) and, in response, analyze a script and/or historical data in a diagnostic database. The network server may determine an amount of disruption impact based on the malfunction occurring on the element. If the amount is below a threshold, then the network server may continue the method 300 by identifying which information should be selectively pulled. For example, the network server may not pull all data from the malfunctioning element, but determine that certain information (e.g., at least diagnostic data and sensor data) should be pulled, thereby improving the functioning of the cell site by increasing the speed with which information can be pulled and reducing the disruption (i.e., down-time) involved in pulling the information.

The method 300 also includes step 310 in which the network server, based on the amount of disruption impact, is selectively pulling information (e.g., diagnostics data, sensor data, and/or other identifiers) from the element prior to reset, such as by accessing the local memory and/or cache prior to the memory being overwritten due to the reset. In some embodiments, the network server may be determining, based on the pulled information (e.g., sensor data), a humidity level of the cell site, and also identifying a correlation between the humidity level and the malfunction experienced by the element. Thus, the network server may diagnose that the malfunction is due to excess relative humidity at the location of the cell site, and thus notify a server that a technician should be sent out to add more weather sealant and/or trigger a heating ventilation and air conditioning system to operate more frequently in order to reduce the humidity within cabinets surrounding elements at the cell site. In some embodiments, the network server may perform alterations to processes on the malfunctioning element, at the cell site, and/or in the network in response to the amount of disruption impact. For example, the network server may alter at least one of: use of a cellular frequency by calls traversing the cell site, routing of communications (e.g., calls and/or data stream) through another element at the same and/or different cell site, and/or routing of communications (e.g., calls and/or data stream) to another cell site.

The method 300 may also include step 312 in which the network server is remotely initiating a reset for the element in the cell site. This may occur once the network server verifies that the pulling of information about the element has finished. The network server may initiate a request message to the malfunctioning element and/or a circuit controlling operations of the malfunctioning element (e.g., element management system 112), where the request message triggers release of a processing hold that may have been used to delay the automatic reset for the element.

The method 300 also includes step 314 relaying, by the network server, the diagnostics data to a server associated with a vendor of the element. In some embodiments, the method 300 may also include the network server initiating a request for replacing the element at the cell site with another element (i.e., replacement element) that is not associated with chronic malfunctions. For example, the malfunctioning element (e.g. a remote radio head) may be manufactured by vendor A and have hardware and/or software version number 1.0. The replacement element may be manufactured by the same vendor but have hardware and/or software version number 2.0 (e.g., new processors, new algorithms, etc.) that address the malfunctions occurring in version 1.0, and therefore allow the replacement to not be associated with chronic malfunctions. In some embodiments, the network server may identify the vendor and model associated with the malfunctioning element, and replacement of the model type may comprise identifying a different model number for equipment associated with the same or different vendor (e.g., a newly released remote radio head with version 2.0 software and different model number that does not have chronic malfunctions). This request may be sent to a trouble ticket database associated with a communication service provider and/or other maintenance database that alerts servers to display a maintenance request to technicians that maintain the cell site. The network server may also notify a vendor server associated with the model type of the element, such as by sending a notification containing information about the frequency with which elements are replaced and/or containing diagnostic data that may be useful in diagnosis and prevention of element downtime. In some embodiments, the network server 150 may generate a request for early replacement of the chronically malfunctioning element with a later version of the element. For example, the element having a first version of software and/or hardware number (such as version 1.0) may be scheduled for replacement every two years (or another defined schedule). Yet because of determination of chronic malfunction, the network server 150 may trigger the element to be replaced with a second version (e.g., version 2.0) before the defined schedule replacement date.

Figure 4:
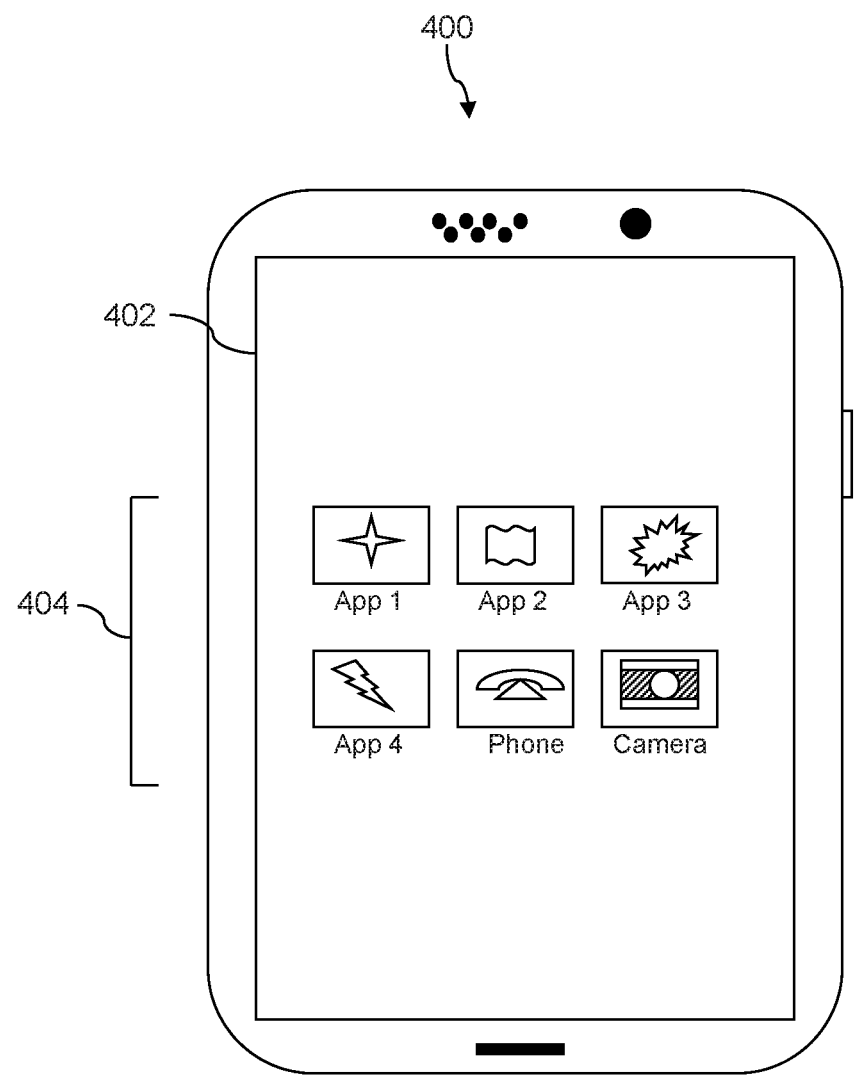
FIG. 4 is an illustration of a user equipment according to an embodiment of the disclosure.

FIG. 4 depicts an embodiment of user equipment (UE) 400, which is operable for implementing aspects of the present disclosure, but the present disclosure should not be limited to these implementations. Though illustrated as a mobile smart phone, the UE 400 may take various forms including a wireless handset, a pager, a personal digital assistant (PDA), a gaming device, or a media player. The UE 400 may be an example of and/or a specific embodiment of the UE 170 discussed above with reference to FIG. 1. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. Some of the application icons 404 may be associated with applications installed in non-transitory memory of the UE and may be configured based on the individual profile, demographics, and/or history of a user associated with the UE 400.

In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands.

These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
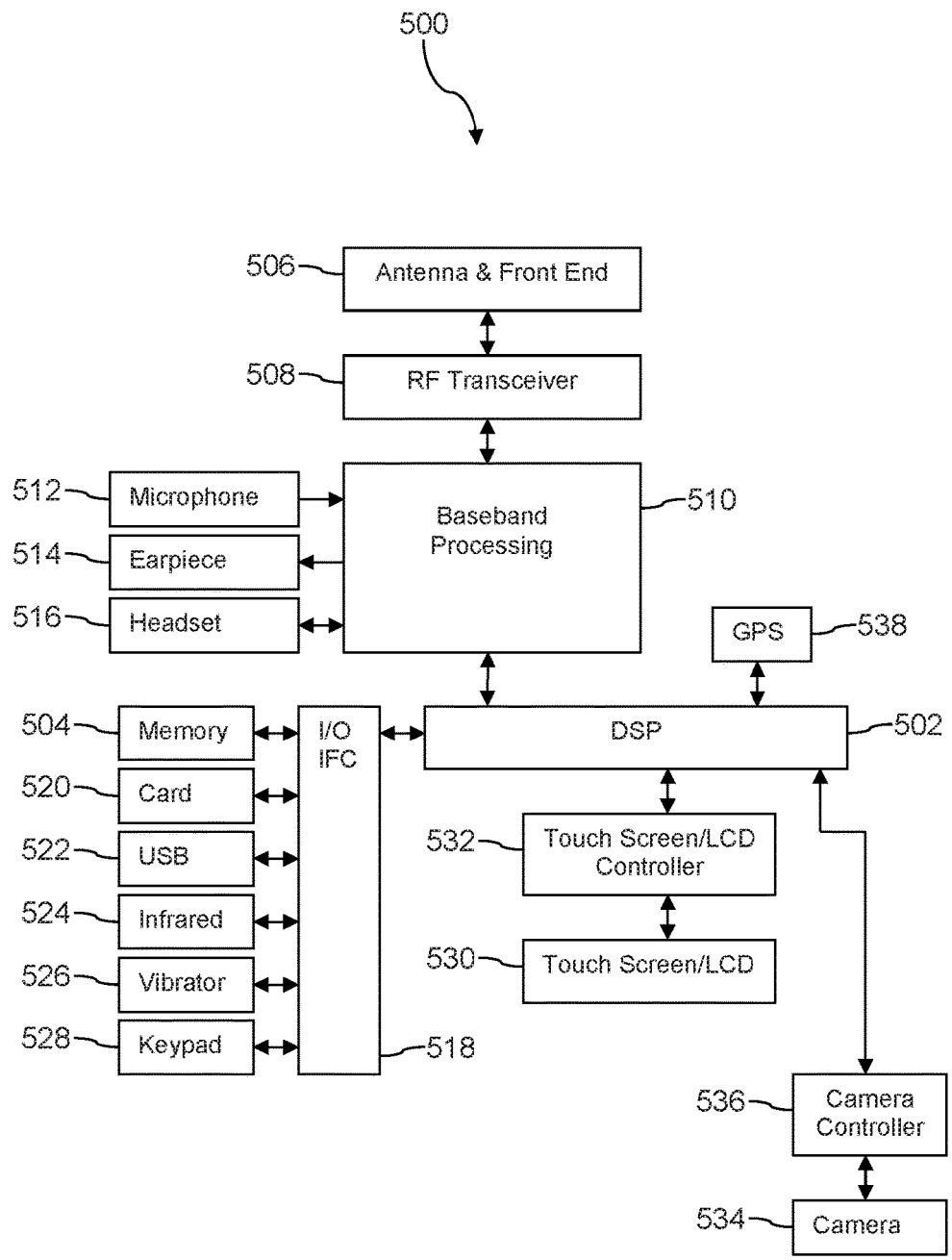
FIG. 5 is a block diagram of a hardware architecture of a user equipment according to an embodiment of the disclosure.

FIG. 5 shows a block diagram of circuitry in an embodiment of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations. In an embodiment, the device 400 may comprise a near field communication (NFC) transceiver. The NFC transceiver may be used to complete payment transactions with point-of-sale terminals or other communications exchanges. In an embodiment, the device 400 may comprise a radio frequency identify (RFID) reader and/or writer device.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
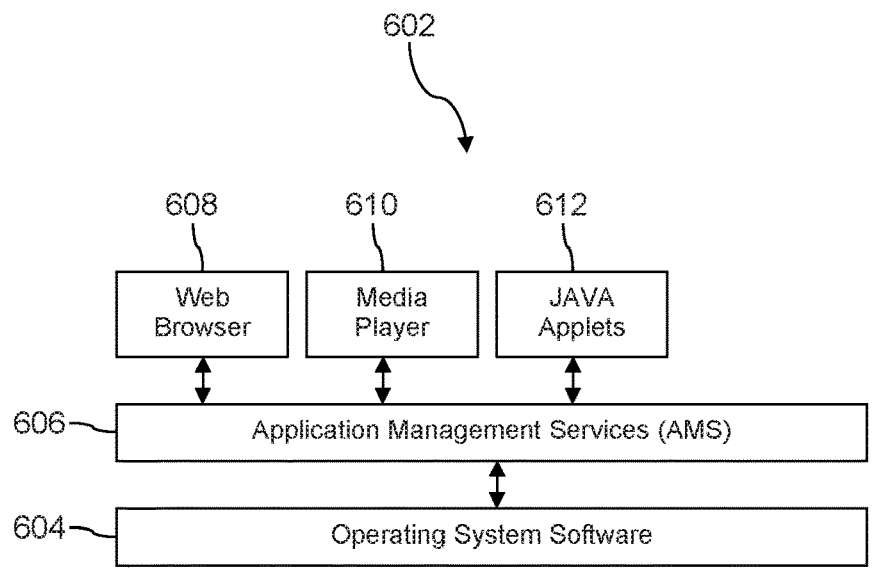
FIG. 6A is a block diagram of a software architecture of a user equipment according to an embodiment of the disclosure.

FIG. 6A illustrates a software environment 602 that may be implemented by the DSP 502, processors of a server (e.g., network server 150), and/or an element at a cell site (e.g. at cell site 102 in FIG. 1). The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audio-visual media. The JAVA applets 612 may be executed by the mobile device 400 to provide a variety of functionality including games, utilities, and other functionality.

Figure 6B:
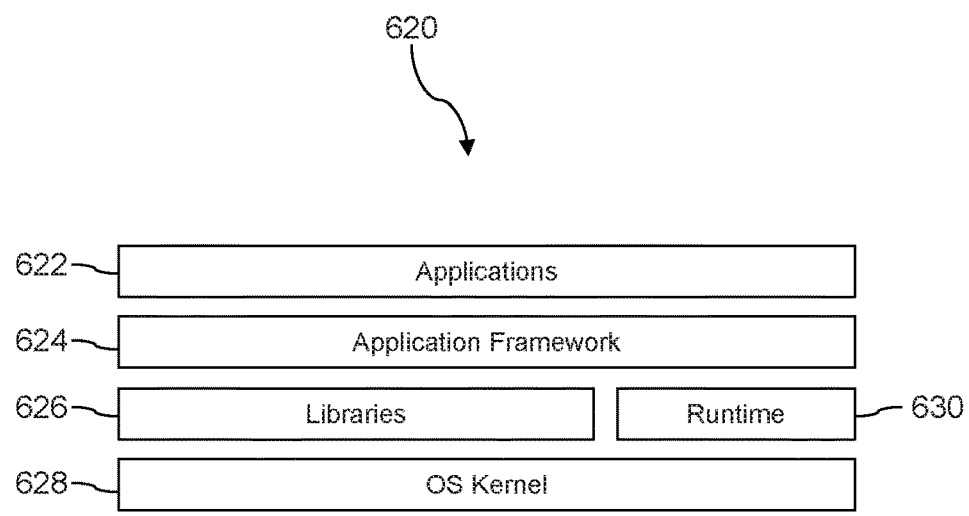
FIG. 6B is a block diagram of another software architecture of a user equipment according to an embodiment of the disclosure.

FIG. 6B illustrates an alternative software environment 620 that may be implemented by the DSP 502. The DSP 502 executes operating system kernel (OS kernel) 628 and an execution runtime 630, which reside at the system level of the User Equipment and, in some embodiments, may not their content (e.g., destination addresses) may not be alterable via download and interaction of software from a server over a network. The DSP 502 executes applications 622 that may execute in the execution runtime 630 and may rely upon services provided by the application framework 624. Applications 622 and the application framework 624 may rely upon functionality provided via the libraries 626.

Figure 7:
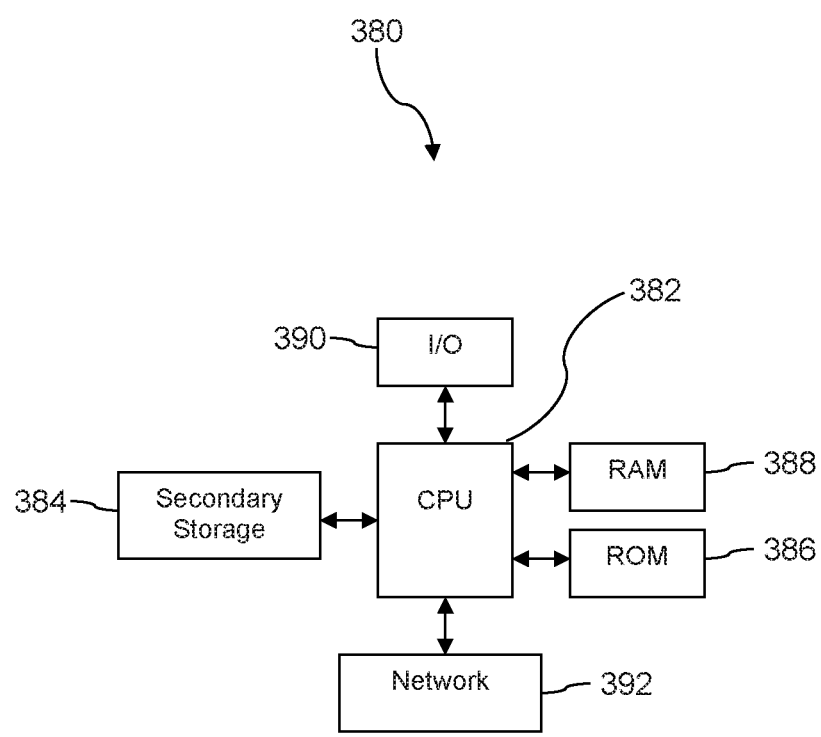
FIG. 7 illustrates an exemplary computer system suitable for implementing the several embodiments of the disclosure.

FIG. 7 illustrates a computer system 380 suitable for implementing one or more embodiments disclosed herein, such as features of system 100 in FIG. 1, including one or more UE 170, network server 150, diagnostic database 160, vendor server 180, elements 104-116 of cell site 102, cell sites 120 through 130, and operations disclosed in FIGS. 2 and 3. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. It is understood that use of the term "memory" in the claims does not include transitory signals. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine, sometimes referred to as a special purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may be comprised on one or more non-transitory computer readable storage medium having computer usable program code embodied therein to implement the functionality disclosed above. The computer program product may comprise data structures, executable instructions, and other computer usable program code. The computer program product may be embodied in removable computer storage media, non-removable computer storage media, or any combination therein. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for intelligent reset delay of cell sites in a network, the method comprising:

detecting, by a network server communicatively coupled to a network, a malfunction and malfunction type from an element in a cell site of the network, wherein the malfunction type identifies that the element should be automatically reset in response to the malfunction, and wherein the element is one of a plurality of elements in the cell site of the network and comprises at least one of a remote radio head, a line card, a management card, a power equipment, a heating ventilation and air conditioning system, or any combination therein;

identifying, by the network server, that the malfunction of the element is chronic based on the malfunction and malfunction type;

in response to determining that the malfunction is chronic, delaying, by the network server, automatic reset for the element in the cell site;

based on the detected malfunction, determining, by the network server, an amount of disruption impact to the cell site that would be triggered by at least pulling diagnostics data from the element;

based on the amount of disruption impact, selectively pulling, by the network server, diagnostics data and sensor data from the element prior to reset;

after delaying the automatic reset and selectively pulling the diagnostics data and sensor data from the element, remotely initiating, by the network server, a reset for the element in the cell site;

relaying, by the network server, the diagnostics data to a server associated with a vendor of the element;

monitoring, by the network server, the element in the cell site that was reset remotely via the network server; and in response to the network server determining that a number of times the element delays reset has exceeded a predefined limit, changing, by the network server, reset at the cell site by at least one of:

remotely initiating reset of another element at the cell site, initiating, by the network server, a replacement of the element via a message to the server associated with the vendor, or reallocating, by the network server, processes from executing on the element at the cell site to another element that is operable to handle the element functions.

2. The method of claim 1, wherein identifying that the malfunction is chronic due to identification that an identifier of the element has changed a plurality of times despite the model type of the element staying the same, wherein the model type corresponds to a version number of hardware, software, or both, associated with the element.

3. The method of claim 1, further comprising: initiating, by the network server, a request for replacing the element at the cell site with another element that is not associated with chronic malfunctions; and notifying, by the network server, a vendor associated with the model type of the element.

4. The method of claim 1, further comprising in response to the amount of disruption impact, altering, by the network server, at least one of:

use of a cellular frequency by calls traversing the cell site, routing of calls through another element at the cell site, or routing of calls to another cell site.

5. A method for intelligent reset delay of cell sites in a network, the method comprising:

detecting, by a network server communicatively coupled to a network, a malfunction and malfunction type from an element in a cell site of the network, wherein the malfunction type corresponds with an automatic reset for the element, and wherein the element is one of a plurality of elements in the cell site of the network and comprises at least one of a remote radio head, a line card, a management card, a power equipment, a heating ventilation and air conditioning system, or any combination therein;

determining, by the network server, that the malfunction is chronic;

in response to determining the malfunction is chronic, delaying, by the network server, automatic reset for the element in the cell site;

based on the detected malfunction, determining, by the network server, an amount of disruption impact to the cell site that would be triggered by at least pulling diagnostics data from the element;

based on the amount of disruption impact, pulling, by the network server, diagnostics data from the element prior to reset;

after delaying the automatic reset and pulling the diagnostics data from the element, remotely initiating, by the network server, reset for the element in the cell site;

monitoring, by the network server, the element in the cell site that was reset remotely via the network server; and in response to the network server determining that a number of times the element delays reset has exceeded a predefined limit, changing, by the network server, reset at the cell site by at least one of:

remotely initiating reset of another element at the cell site, initiating, by the network server, a replacement of the element via a message to a server associated with a vendor of the element, or reallocating, by the network server, processes from executing on the element at the cell site to another element that is operable to handle the element functions.

6. The method of claim 5, wherein determining that the malfunction is chronic comprises:

determining a number of times the element has been previously reset over a predefined time duration in response to the malfunction occurring at the element;

comparing, with another element in the network, the number of times each element has been previously reset due to the same malfunction;

building a threshold corresponding to the number of times a reset can be automatically initiated over the predefined time duration in response to the malfunction before being determined to be chronic; and determining that the malfunction is chronic in response to the element exceeding the threshold.

7. The method of claim 5, wherein determining the disruption impact comprises determining a time period involved in pulling the diagnostics data.

8. The method of claim 5, further comprising: in response to the amount of disruption impact, altering, by the network server, at least one of:

use of a cellular frequency by calls traversing the cell site, routing of calls through another element at the cell site, or routing of calls to another cell site.

9. The method of claim 5, further comprising: in response to pulling the diagnostics data, initiating, by the network server, a reset sequence that selectively resets a plurality of elements within the cell site.

10. The method of claim 5, further comprising sending, by the network server to the vendor associated with the element, trends showing increased frequency of the malfunction on the element based on the diagnostics data.

11. A system for intelligent reset delay of cell sites in a network, the system comprising:

a cell site communicatively coupled to a network, the cell site comprising an element of a plurality of elements that are operable to implement functionality of the cell site, wherein the element comprises at least one of a remote radio head, a line card, a management card, a power equipment, a heating ventilation and air conditioning system, or any combination therein; and a network server communicatively coupled to the network, comprising:

a non-transitory memory storing an application, and a processor that, upon being configured by execution of the application:

detects a malfunction and malfunction type from an element in a cell site of the network, wherein the malfunction type corresponds with an automatic reset for the element, determines that the malfunction is chronic, in response to the determination that the malfunction is chronic, delays the automatic reset for the element in the cell site, based on the detected malfunction, determines an amount of disruption impact to the cell site that would be triggered by at least pulling diagnostics data from the element, based on the amount of disruption impact, pulls diagnostics data from the element prior to reset, after delaying the automatic reset and pulling the diagnostics data from the element, remotely initiates reset for the element in the cell site, monitors the element in the cell site that was reset remotely via the network server, and in response to a determination that a number of times the element delays reset has exceeded a predefined limit, changes reset at the cell site by at least one of:

initiates reset of another element at the cell site, initiates a replacement of the element via a message to a server associated with a vendor of the element, or reallocates processes from executing on the element at the cell site to another element that is operable to handle the element functions.

12. The system of claim 11, wherein the network server further determines a number of times the element has been reset over a predefined time duration in response to the malfunction, and builds a threshold corresponding to the number of times a reset is automatically initiated in response to the malfunction over the predefined time duration.

13. The system of claim 11, wherein determination of the disruption impact comprises determination of a time period involved in the network server pulling the diagnostics data.

14. The system of claim 11, wherein the processor is further configured such that in response to the amount of disruption impact, the processor alters at least one of:

use of a cellular frequency by calls traversing the cell site, routing of calls through another element at the cell site, or routing of calls to another cell site.

15. The system of claim 11, wherein the processor is further configured such that in response to the diagnostics data being pulled, initiates a reset sequence that selectively resets a plurality of elements within the cell site.

16. The system of claim 11, wherein the processor further sends, to the server associated with the vendor of the element, trends about the malfunction of the element based on the diagnostics data.

\* \* \* \* \*